US010467015B2

(12) United States Patent
Dasar et al.

(10) Patent No.: US 10,467,015 B2
(45) Date of Patent: Nov. 5, 2019

(54) METHOD FOR OUT OF BAND DEVICE CONFIGURATION DEPLOYMENT AND SYSTEM THEREFOR

(71) Applicant: Dell Products, LP, Round Rock, TX (US)

(72) Inventors: Sundar Dasar, Round Rock, TX (US); Yogesh P. Kulkarni, Round Rock, TX (US); William C. Munger, Round Rock, TX (US); Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/847,894

(22) Filed: Sep. 8, 2015

(65) Prior Publication Data

US 2017/0068548 A1    Mar. 9, 2017

(51) Int. Cl.
| G06F 9/44 | (2018.01) |
| G06F 9/4401 | (2018.01) |
| G06F 9/445 | (2018.01) |

(52) U.S. Cl.
CPC ........ G06F 9/4401 (2013.01); G06F 9/44505 (2013.01)

(58) Field of Classification Search
CPC ..... G06F 1/32; G06F 1/00; G06F 1/28; G06F 1/26; G06F 9/44
USPC ....... 713/300, 310, 320, 321, 322, 323, 324, 713/340, 375
See application file for complete search history.

(56) References Cited

U.S. PATENT DOCUMENTS

| 7,774,596 B2* | 8/2010 | Flynn ................ G06F 9/4406 713/1 |
| 7,904,708 B2 | 3/2011 | Harmer |
| 7,971,050 B2 | 6/2011 | Joshi et al. |
| 7,991,785 B1* | 8/2011 | Yakovlev ............ G06F 9/4411 707/769 |
| 8,078,865 B2 | 12/2011 | Brumley et al. |
| 8,219,792 B2 | 7/2012 | Jaber et al. |
| 8,423,756 B2 | 4/2013 | Harmer |
| 10,007,507 B2* | 6/2018 | Huang ................ G06F 8/654 |
| 2005/0144428 A1* | 6/2005 | Rothman ............ G06F 9/4411 713/1 |
| 2008/0244257 A1 | 10/2008 | Vaid et al. |
| 2008/0256295 A1* | 10/2008 | Lambert ............ G06F 9/4406 711/118 |
| 2009/0327741 A1 | 12/2009 | Zimmer et al. |
| 2010/0169629 A1* | 7/2010 | Zhang ................ G06F 9/44505 713/1 |

(Continued)

FOREIGN PATENT DOCUMENTS

EP    1 975 836 A2    10/2008

*Primary Examiner* — Jaweed A Abbaszadeh
*Assistant Examiner* — Keshab R Pandey
(74) *Attorney, Agent, or Firm* — Larson Newman, LLP

(57) ABSTRACT

An information handling system includes a non-volatile memory device for storing basic input-output system (BIOS) firmware. The system also includes a service processor that is coupled to the first non-volatile memory. The service processor initiates access to the first non-volatile memory, and stores configuration information at the non-volatile memory device. The configuration information can include Unified Extensible Firmware Interface (UEFI) Human Interface Infrastructure (HII) strings.

16 Claims, 4 Drawing Sheets

(56) References Cited

U.S. PATENT DOCUMENTS

| | | | |
|---|---|---|---|
| 2010/0228960 A1* | 9/2010 | Huang | G06F 8/65 713/100 |
| 2011/0029764 A1* | 2/2011 | Harmer | G06F 9/4443 713/2 |
| 2013/0091260 A1* | 4/2013 | Murphy | G06F 8/665 709/221 |
| 2014/0047224 A1* | 2/2014 | Ayanam | G06F 8/665 713/1 |
| 2014/0208092 A1* | 7/2014 | Huang | G06F 8/654 713/2 |
| 2014/0365755 A1 | 12/2014 | Liu et al. | |
| 2015/0074386 A1* | 3/2015 | Huang | G06F 9/4401 713/2 |
| 2015/0143095 A1* | 5/2015 | Maity | G06F 11/1417 713/2 |
| 2015/0149815 A1* | 5/2015 | Maity | G06F 11/1435 714/5.11 |
| 2015/0169330 A1* | 6/2015 | Maity | G06F 9/4401 713/1 |

* cited by examiner

METHOD FOR OUT OF BAND DEVICE CONFIGURATION DEPLOYMENT AND SYSTEM THEREFOR

FIELD OF THE DISCLOSURE

This disclosure relates generally to information handling systems, and more particularly relates to out of band device configuration deployment at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-4 illustrate techniques for updating a configuration of devices included at an information handling system. In particular, a service processor is adapted to store configuration information at a basic input/output system (BIOS) non-volatile random access memory (NVRAM). The BIOS NVRAM is the primary, or only, memory device for storing BIOS firmware at the information handling system. The configuration information can include Unified Extensible Firmware Interface (UEFI) Human Interface Infrastructure (HII) configuration information. The service processor can store the UEFI HII configuration information at the BIOS NVRAM when the information handling system is not fully operational, referred to herein as out-of-band. The HII configuration information can include HII route configuration strings, which is a data format used by a UEFI-compliant BIOS system to update the configuration of configurable devices at the information handling system. During a subsequent initialization operation at the information handling system, the BIOS firmware can retrieve the configuration information previously stored at the BIOS NVRAM by the service processor, and update the configuration of corresponding devices based on the retrieved information.

Figure 1:
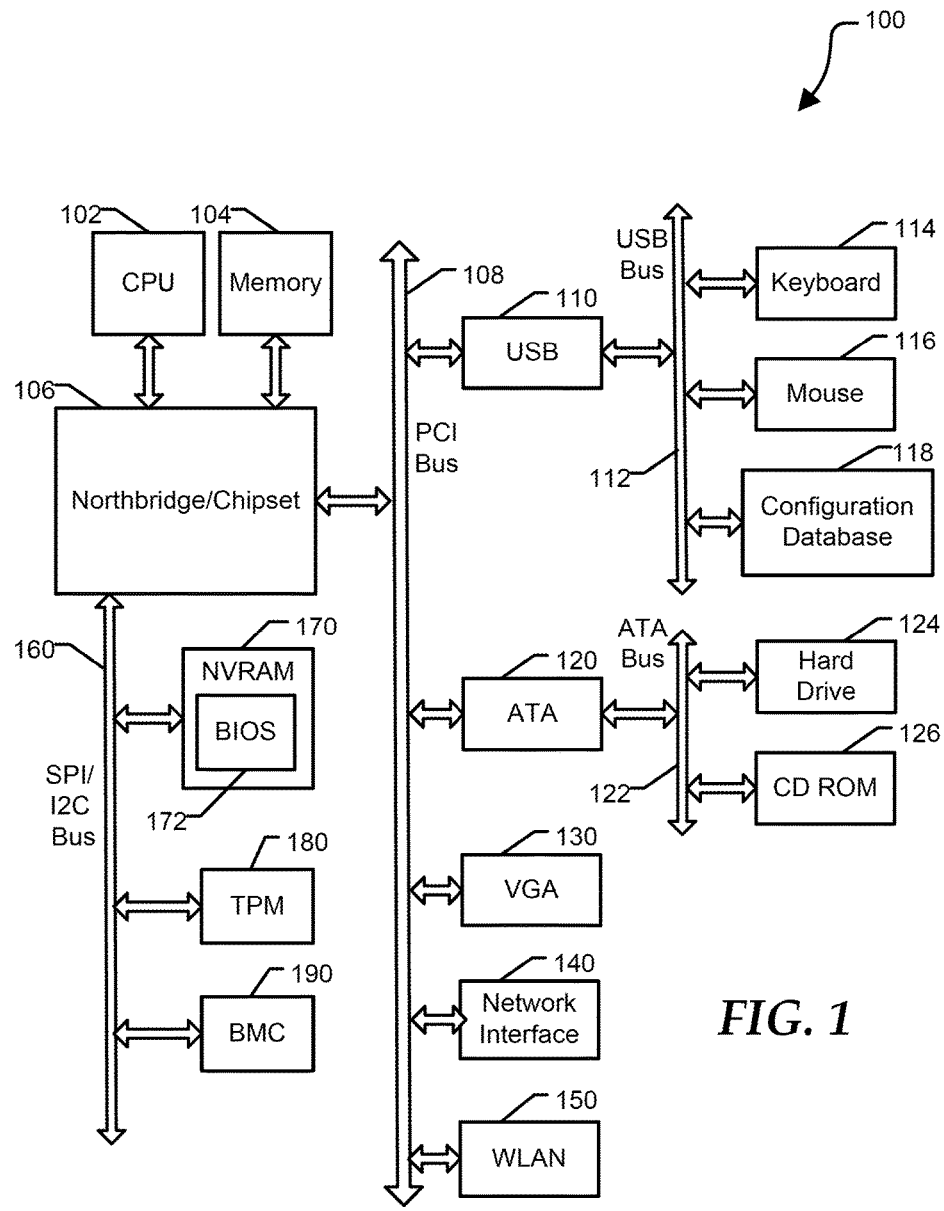
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a trusted platform module (TPM) 180, and a baseboard management controller (BMC) 190. BMC 190 can be referred to as a service processor. BMC 190 is configured to provide out-of-band access to devices at information handling system 100. As used herein, out-of-band access herein refers to operations performed prior to execution of BIOS 172 by processor 102 to initialize operation of system 100. In one embodiment BMC 190 is configured to store configuration information at NVRAM 170 before system 100 is initialized by BIOS 172.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Configuration database 118 can include a second NVRAM that is different from BIOS NVRAM 170. Alternatively, configuration database 118 can be stored at NVRAM 170 along with BIOS 172. In an embodiment, configuration database 118, and the corresponding NVRAM in particular, is configured to operate as a USB device. Accordingly, system 100 can communicate with configuration database 118 using USB protocols. During initialization of information handling system, a pre-boot firmware application program can retrieve current configuration information from devices included at system 100 and store the information at configuration database 118. The application program can store the current configuration information at database 118 as native HII strings, without converting the information to another format, such as an Extensible Markup Language (XML) format. Configuration database is also accessible by BMC 190. In an embodiment, BMC 190 can access database 118 out-of-band.

The HII specification provides application programming interfaces (APIs) to allow drivers, including those on plug-in cards, to have full access to HII resources, including forms, strings, and fonts, and be able to contribute additional resources. An HII database typically does not represent a single memory storage device, but instead includes a data structure for identifying one or more memory devices that comprise the HII database. For example, a UEFI compliant hardware device, such as network interface controller 140, can include an internal memory device, such as a NVRAM, for storing device driver attributes including information represented in the HII database. The UEFI specification provides access protocols to access and manipulate HII configuration information. For example, the EFI_HII_CONFIG_ACCESS_PROTOCOL provides an ExtractConfig( ) function to retrieve a current configuration setting, and a RouteConfig( ) function to change the current configuration setting. Configuration information is stored in the form of HII strings, including UEFI configuration language strings. In an embodiment, BMC 190 can store configuration update information at BIOS NVRAM 170 using a format consistent with the RouteConfig function. Accordingly, firmware 172 does not need to convert the updated configuration information from an alternate format, such as XML, before providing the information to a device being updated.

Figure 2:
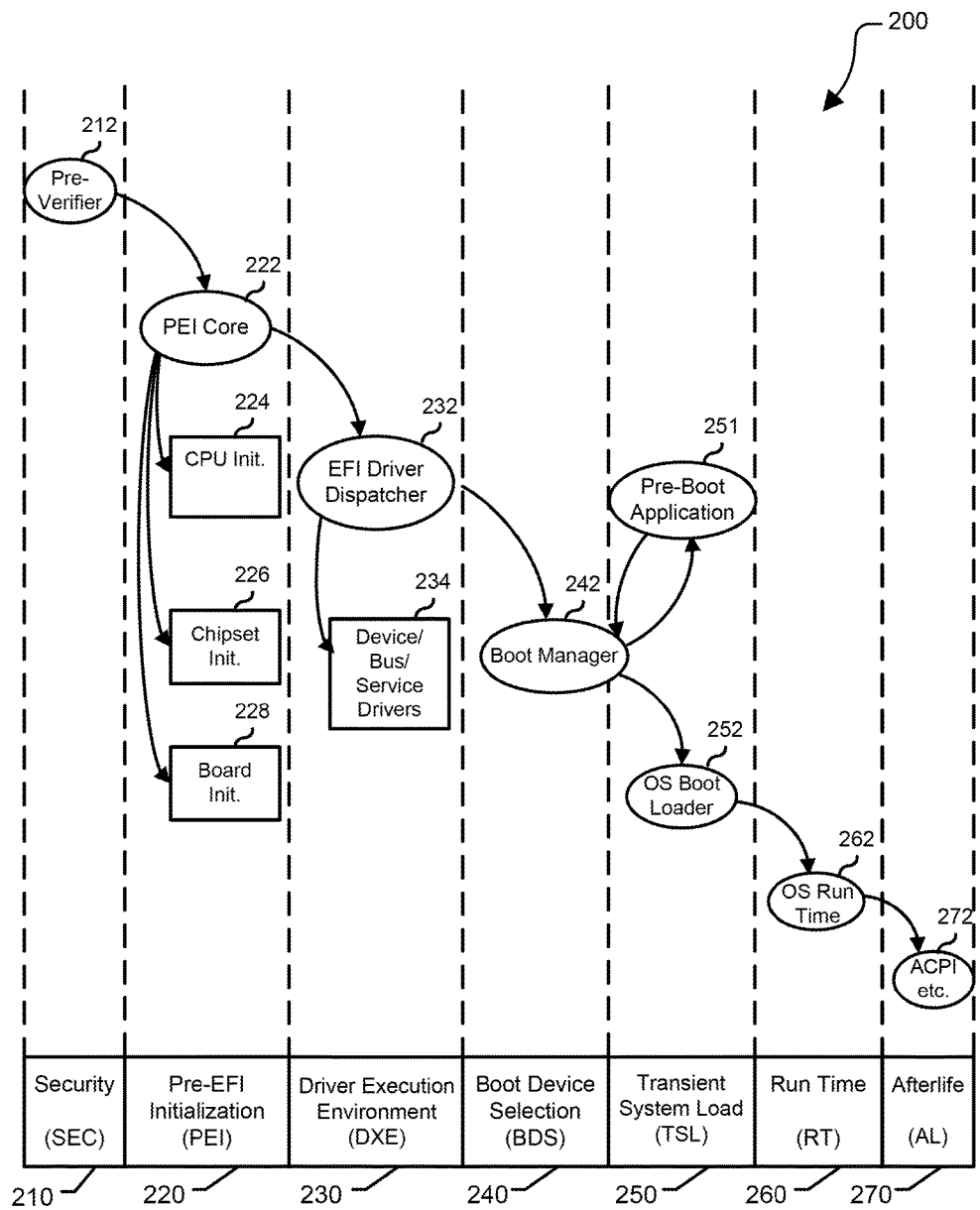
FIG. 2 is a phase diagram for a UEFI boot of the information handling system of FIG. 1 according to a specific embodiment of the present disclosure.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, a run time phase (RT) 260, and an afterlife phase (AL) 270. SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 210 is executed out of the firmware resident on the information handling system, such as BIOS 172, and so serves as a root of trust for the system. SEC 210 passes execution to PEI 220 which initializes the system memory for the information handling system. PEI 220 includes PEI core code 222, which oversees CPU initialization 224, chipset initialization 226, and board resource initialization 228.

PEI 220 passes execution to DXE 230 which performs device specific initializations for the information handling system. In particular, DXE 230 executes an EFI driver dispatcher 232 that operates to load device, bus, and service drivers 234. DXE 230 passes execution to BDS 240 and executes a boot manager 242 which identifies a boot target, and passes execution to TSL 250. TSL 250 can launch an OS boot loader 252, which loads the operating system and passes execution to the OS runtime environment 262 at RT 260. RT 260 can remain active until system 100 is reset, an Advanced Configuration and Power Interface (ACPI) event is initiated, and the like, at which time execution is passed to AL 270. AL 270 refers to times that the firmware takes control back from the primary OS, such as when system 100 enters a low-power mode of operation. Alternatively, TSL 250 can launch one or more pre-boot applications 251. In one embodiment, a pre-boot application can store current device configuration information at configuration database 118. In a particular embodiment, the HII information stored at database 118 retains a format of the HII database. Upon completion of the pre-boot application 251, boot manager 242 can initiate OS boot loader 252, which loads the primary operating system.

Figure 3:
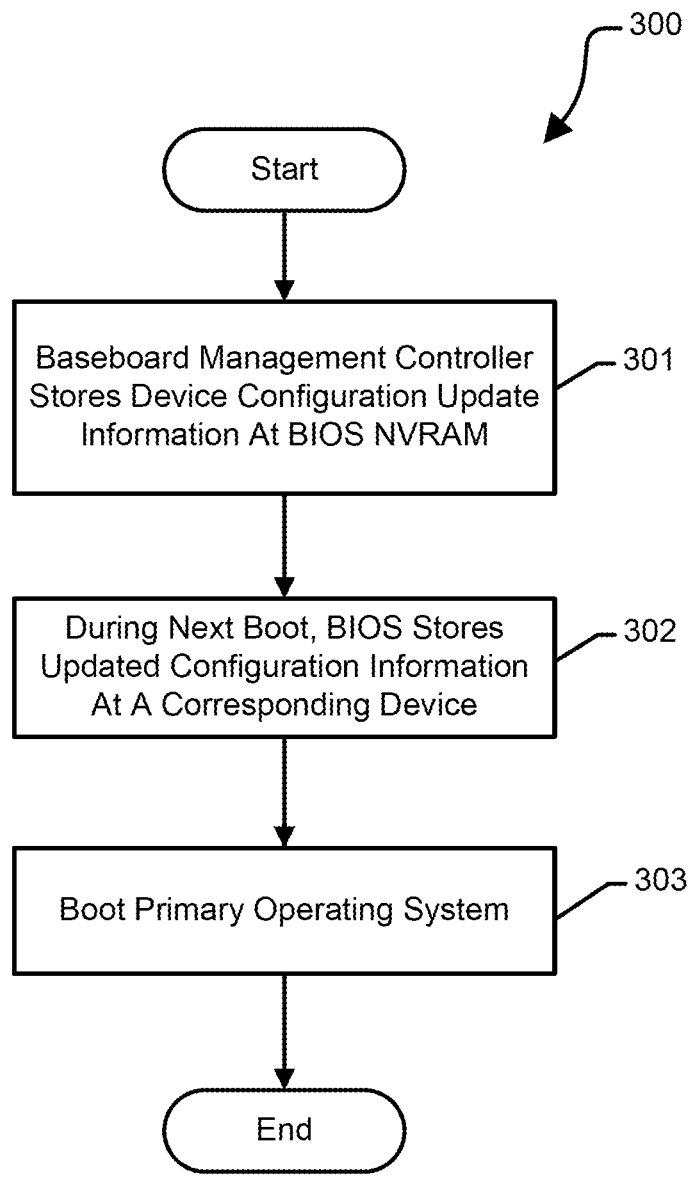
FIG. 3 is a flow diagram illustrating a method for performing out-of-band configuration of the information handling system of FIG. 1 according to a specific embodiment of the present disclosure.

FIG. 3 is a flow diagram illustrating a method 300 for performing out-of-band configuration of the information handling system of FIG. 1 according to a specific embodiment of the present disclosure. Method 300 begins at block 301 where a baseboard management controller stores device configuration update information at a BIOS NVRAM. For example, BMC 190 can store updated device configuration information at BIOS NVRAM 170 as UEFI HII route configuration strings, XML, or another standard or proprietary format. In an embodiment, BMC 190 can access NVRAM 170 out-of-band. The BIOS NVRAM is the primary storage device for system firmware. During initialization of system 100, BIOS instructions are fetched from BIOS NVRAM 170 and executed by CPU 102. The method continues at block 302 where, during a next boot, firmware can store the updated configuration at a corresponding device. For example, during initialization of system 100, as shown at FIG. 2, firmware can retrieve updated configuration information from NVRAM 170 and provide the new configuration data to one or more identified devices. Method 300 completes at block 303 where a primary operating system is loaded. For example, after devices have been reconfigured and initialization of system 100 has completed, a primary OS can be installed and operation of system 100 can be handed over to the primary OS.

Figure 4:
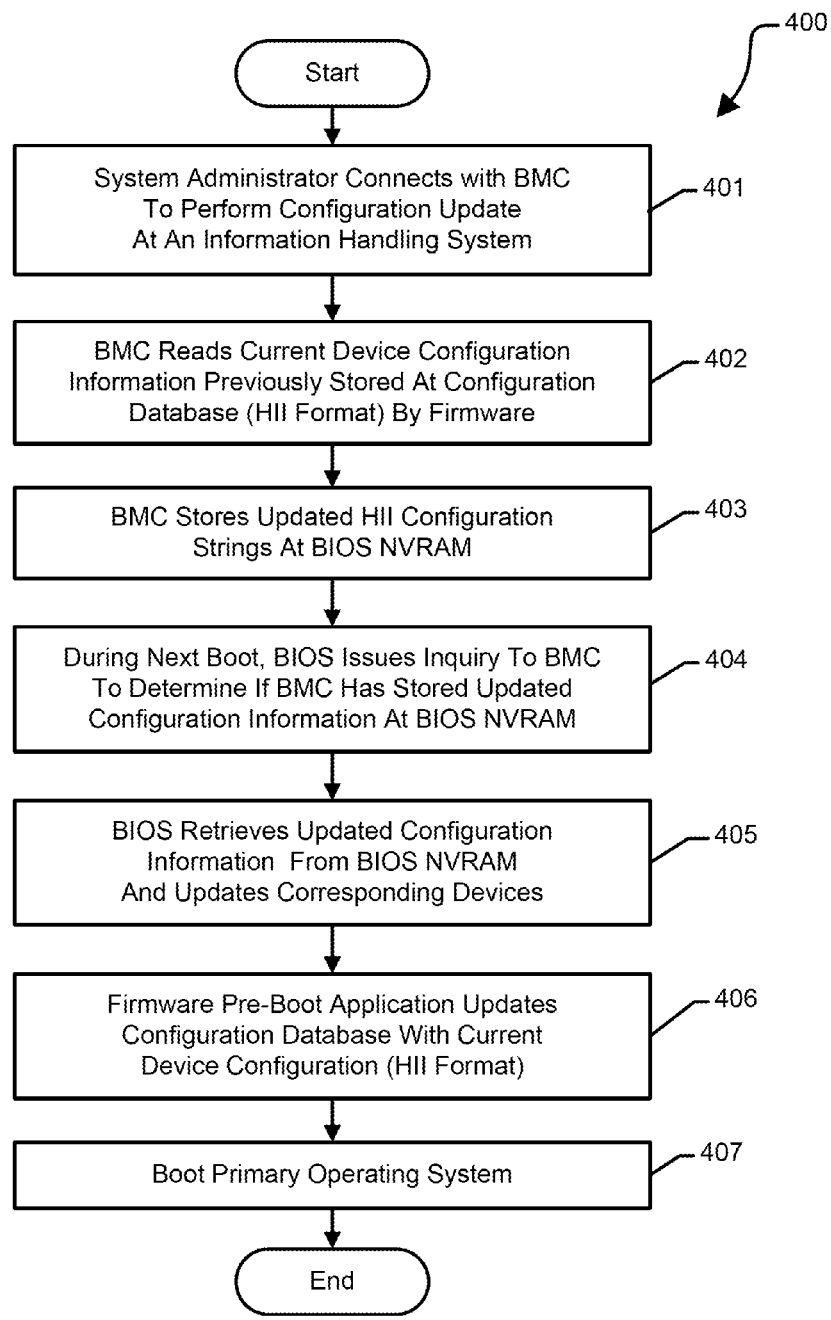
FIG. 4 is a flow diagram illustrating another method for performing out-of-band configuration of the information handling system of FIG. 1 according to a specific embodiment of the present disclosure.

FIG. 4 is a flow diagram illustrating a method 400 for performing out-of-band configuration of FIG. 1 according to a specific embodiment of the present disclosure. Method 400 begins at block 401 where a system administrator connects with a BMC at an information handling system to perform a configuration update. For example, an information technology professional can establish communication with BMC 190 via a telecommunications network. The communication can be performed out-of-band, e.g. prior to CPU 102 beginning execution of BIOS 172. The method proceeds to block 402 where the BMC reads the current configuration information previously stored by firmware at a configuration database. One of skill will appreciate that the current, or old, configuration of a device may be irrelevant and retrieving the current configuration is optional. Furthermore, configuration database is not required in order to implement the techniques disclosed herein.

Method 400 continues at block 403 where the BMC stores updated HII configuration strings at the BIOS NVRAM. As described above, BMC 190 can store the updated configuration information at BIOS NVRAM 170, formatted as UEFI HII route configuration strings, or in another format. The method continues at block 404 where, during the next boot, BIOS issues an inquiry to the BMC, the inquiry to determine if the BMC has stored updated configuration information at the BIOS NVRAM. For example, during the boot process at system 100, firmware can communicate with BMC 190, e.g. using an Intelligent Platform Management Interface (IPMI). In response to the inquiry, BMC 190 can acknowledge and identify updated configuration information that is stored at BIOS NVRAM 170. If updated configuration information has been stored at the BIOS NVRAM, the method proceeds to block 405 where BIOS retrieves the updated configuration information from the BIOS NVRAM and updates devices accordingly.

The method continues at block 406 where firmware can execute a pre-boot application that updates a configuration database, if present, with the current device configuration. For example, a boot manager provided by firmware can initiate pre-boot application 251, which accesses and retrieves HII configuration strings from each UEFI compliant and configurable device at system 100, and store the retrieved HII strings at configuration database 118. BMC 190 can access the current configuration information from database 118 anytime thereafter. Method 400 completes at block 407 where a primary operating system can be loaded and control of system 100 is passed to the operating system.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A data processing system comprising:
a network interface;
a first non-volatile memory device;
a second non-volatile memory device that is different from the first non-volatile memory device, the second non-volatile memory device configured according to the uniform serial bus (USB) protocol as a USB device and storing a configuration database;
a baseboard management controller coupled to the first non-volatile memory device, coupled to the second non-volatile memory device, and coupled to the network interface, the baseboard management controller executing instructions that cause the baseboard management controller to:
store initial configuration information prior to executing a basic input/output system (BIOS) code during an initial execution of a boot sequence, the initial configuration information received from the first non-volatile memory device that also stores the BIOS code, the initial configuration information including Unified Extensible Firmware Interface (UEFI) Human Interface Infrastructure (HII) strings via the network interface;
perform a subsequent execution of the boot sequence after the initial execution of the boot sequence;
determine, during the subsequent execution of the boot sequence, that the second non-volatile memory device storing the configuration database stores updated configuration information that is different from the initial configuration information stored in the first non-volatile memory device; and
update the subsequent execution of the boot sequence based on the updated configuration information stored by the configuration database in the second non-volatile memory device; and
a central processing unit operable to execute the BIOS code for a BIOS firmware after the subsequent execution of the boot sequence is executed based on the updated configuration information stored by the configuration database in the USB device.

2. The data processing system of claim 1, wherein the configuration database stores calls to the HII strings.

3. The data processing system of claim 1, wherein the central processing unit configures a device without a conversion of the HII strings.

4. The data processing system of claim 1, wherein the service processor reformats the HII strings.

5. The data processing system of claim 1, wherein the central processing unit retrieves the HII strings.

6. The data processing system of claim 1, wherein the BIOS firmware queries the baseboard management controller for determining that the configuration database stores the updated configuration information.

7. The data processing system of claim 6, wherein the baseboard management controller identifies the updated configuration information.

8. The data processing system of claim 6, wherein the initial execution of the boot sequence is performed after an electrical power is applied to the baseboard management controller.

9. The data processing system of claim 1, wherein the initial execution of the boot sequence is performed after an electrical power is applied to the central processing unit.

10. A method comprising:
receiving, by a baseboard management controller, initial configuration information retrieved during an initial execution of a boot sequence from a first non-volatile memory device storing a basic input/output system (BIOS) code, the initial configuration information formatted as Unified Extensible Firmware Interface (UEFI) Human Interface Infrastructure (HII) strings, the baseboard management controller operating at an information handling system;
initiating, by the baseboard management controller, a subsequent execution of the boot sequence after the initial execution of the boot sequence;
determining, by the baseboard management controller during the subsequent execution of the boot sequence, that a second non-volatile memory device configured according to the uniform serial bus (USB) protocol as a USB device stores updated configuration information that is different from the initial configuration information stored in the first non-volatile memory device;
executing, by the baseboard management controller, the subsequent execution of the boot sequence based on the updated configuration information stored by the USB device; and
executing the BIOS code, by a central processing unit at the information handling system, after the subsequent execution of the boot sequence is executed based on the updated configuration information stored by the USB device.

11. The method of claim 10, further comprising receiving a query at the baseboard management controller, the query sent from the BIOS code for the updated configuration information.

12. The method of claim 10, further comprising receiving an acknowledgment from the baseboard management controller that identifies the updated configuration information.

13. The method of claim 11, further comprising receiving an Intelligent Platform Management Interface (IPMI) inquiry issued by the central processing unit to the baseboard management controller for the updated configuration information.

14. The method of claim 10, further comprising:
retrieving the updated configuration information; and
storing the updated configuration information at the first non-volatile memory device.

15. The method of claim 14, further comprising:
retrieving, by the baseboard management controller, the HII strings from the USB device.

16. A non-transitory data storage medium storing instructions executable by a baseboard management controller at an information handling system to cause the baseboard management controller to:
receive initial configuration information during an initial execution of a boot sequence, the initial configuration information stored by a first non-volatile memory device storing a basic input/output system (BIOS) code;
initiate a subsequent execution of the boot sequence after the initial execution of the boot sequence;
issuing a query, during the subsequent execution of the boot sequence, from the first non-volatile memory device to the baseboard management controller for updated configuration information stored to a second non-volatile memory device configured according to the uniform serial bus (USB) protocol as a USB device, the updated configuration information different from the initial configuration information stored by the first non-volatile memory device; and
execute the subsequent execution of the boot sequence based on the updated configuration information stored by the USB device.

* * * * *